US012618814B2

(12) United States Patent
Chiyomaru et al.

(10) Patent No.: US 12,618,814 B2
(45) Date of Patent: May 5, 2026

(54) MONITORING SYSTEM AND MONITORING METHOD

(71) Applicant: MITSUBISHI HEAVY INDUSTRIES, LTD., Tokyo (JP)

(72) Inventors: Masaru Chiyomaru, Tokyo (JP); Hiroaki Mikawa, Tokyo (JP); Yuichi Okuzaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1145 days.

(21) Appl. No.: 17/627,889

(22) PCT Filed: Aug. 4, 2020

(86) PCT No.: PCT/JP2020/029813
§ 371 (c)(1),
(2) Date: Jan. 18, 2022

(87) PCT Pub. No.: WO2021/065190
PCT Pub. Date: Apr. 8, 2021

(65) Prior Publication Data
US 2022/0252562 A1 Aug. 11, 2022

(30) Foreign Application Priority Data

Oct. 4, 2019 (JP) ................................. 2019-183795

(51) Int. Cl.
*G01N 31/22* (2006.01)
*G01N 31/18* (2006.01)
*G01N 35/10* (2006.01)

(52) U.S. Cl.
CPC ........... *G01N 31/221* (2013.01); *G01N 31/18* (2013.01); *G01N 35/1002* (2013.01); *G01N 35/1009* (2013.01)

(58) Field of Classification Search
CPC .. G01N 31/221; G01N 31/18; G01N 35/1002; G01N 35/1009
See application file for complete search history.

(56) References Cited

U.S. PATENT DOCUMENTS

| 2,928,782 | A | * | 3/1960 | Leisey | ................... | G01N 27/44 |
| | | | | | | 204/405 |
| 2003/0175983 | A1 | * | 9/2003 | Wei | ......................... | G01N 21/79 |
| | | | | | | 436/163 |
| 2005/0037508 | A1 | | 2/2005 | Hernandez et al. | | |

FOREIGN PATENT DOCUMENTS

| JP | H 01165957 | * | 6/1989 |
| JP | H01165957 A | | 6/1989 |

(Continued)

OTHER PUBLICATIONS

USGS "pH scale." Retrieved from: https://www.usgs.gov/media/ images/ph-scale#:~:text=The%20scale%20has%20values% 20ranging,neutral%E2%80%94neither%20acidic%20or%20basic. (Year: 2019).*

(Continued)

*Primary Examiner* — Charles Capozzi
*Assistant Examiner* — Alex Ramirez
(74) *Attorney, Agent, or Firm* — HAUPTMAN HAM, LLP

(57) ABSTRACT

A system for monitoring the alkalinity of a treatment liquid in a treatment tank includes a reaction tank; an indicator burette which drops an indicator into the reaction tank; a reagent burette which drops an acidic reagent into the reaction tank; a probe-type absorptiometer to be inserted into the reaction tank; a measuring device which analyzes the transmittance of a solution detected by the absorptiometer to calculate the alkalinity; a first system that collects the treatment liquid from the treatment tank for storing and supplies the treatment liquid to the reaction tank; a control (Continued)

device which controls the operation of the first system so as to supply the treatment liquid to the reaction tank, outputs a completion signal to the measuring device, and controls a discharge system so as to discharge the treatment liquid in the reaction tank, when the calculation of alkalinity by the measuring device is completed.

7 Claims, 6 Drawing Sheets

(56) References Cited

FOREIGN PATENT DOCUMENTS

| JP | H07306146 | A | | 11/1995 |
|----|-----------|---|---|---------|
| JP | 2001356118 | A | | 12/2001 |
| JP | 2004264139 | A | * | 9/2004 |
| JP | 2005062186 | A | | 3/2005 |
| JP | 2009075019 | A | | 4/2009 |
| JP | 2009264913 | A | | 11/2009 |
| JP | 2010164465 | A | | 7/2010 |

OTHER PUBLICATIONS

"Connect to a spectrophotometer." Retreived Jun. 26, 2025 from: https://knowledge1.thermofisher.com/Molecular_Spectroscopy/ Molecular_Spectroscopy_Software/OMNIC_Family/OMNIC_ Paradigm_Software/OMNIC_Paradigm_Operator_Manuals/Latest_ OMNIC_Paradigm_User_Guide/Connect_to_a_Spectrometer (Year: 2023).*
Shaffer, Catherine, The Electrode and Beyond: pH measurement in Bioprocessing: Retrieved from: https://www.biocompare.com/ Editorial-Articles/189052-The-Electrode-and-Beyond-pH- Measurement-in-Bioprocessing/ (Year: 2016).*
International Search Report and Written Opinion of International Application No. PCT/JP2020/029813 mailed Oct. 27, 2020; 14pp.

* cited by examiner

FIG. 1

ALKALINE DEGREASING
TREATMENT TANK

PRIMARY WASHING
TREATMENT TANK

SECONDARY WASHING
TREATMENT TANK

FIG. 5

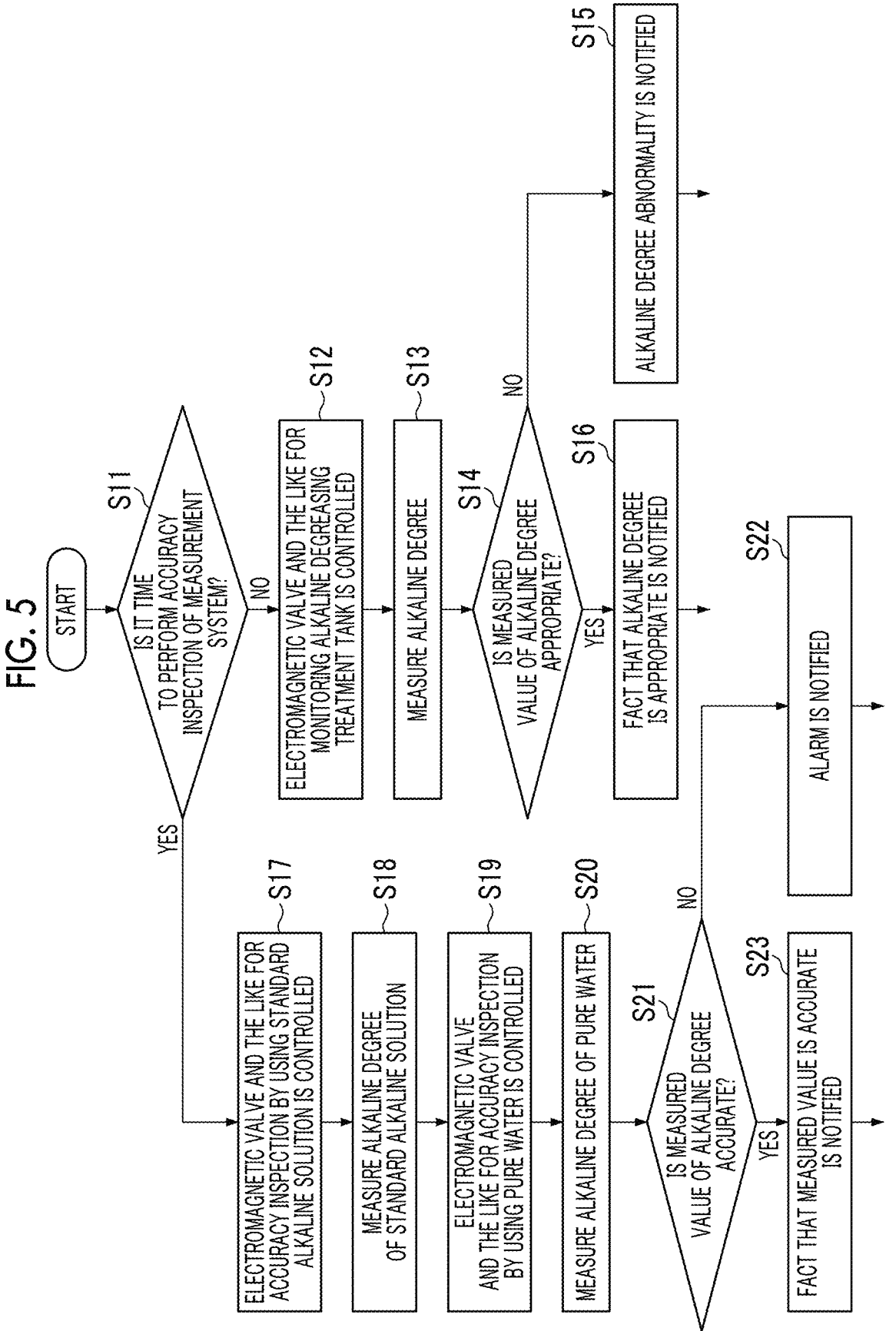

START

S11 — IS IT TIME TO PERFORM ACCURACY INSPECTION OF MEASUREMENT SYSTEM?

NO →

S12 — ELECTROMAGNETIC VALVE AND THE LIKE FOR MONITORING ALKALINE DEGREASING TREATMENT TANK IS CONTROLLED

S13 — MEASURE ALKALINE DEGREE

S14 — IS MEASURED VALUE OF ALKALINE DEGREE APPROPRIATE?

NO → S15 — ALKALINE DEGREE ABNORMALITY IS NOTIFIED

YES → S16 — FACT THAT ALKALINE DEGREE IS APPROPRIATE IS NOTIFIED

YES ↓

S17 — ELECTROMAGNETIC VALVE AND THE LIKE FOR ACCURACY INSPECTION BY USING STANDARD ALKALINE SOLUTION IS CONTROLLED

S18 — MEASURE ALKALINE DEGREE OF STANDARD ALKALINE SOLUTION

S19 — ELECTROMAGNETIC VALVE AND THE LIKE FOR ACCURACY INSPECTION BY USING PURE WATER IS CONTROLLED

S20 — MEASURE ALKALINE DEGREE OF PURE WATER

S21 — IS MEASURED VALUE OF ALKALINE DEGREE ACCURATE?

NO → S22 — ALARM IS NOTIFIED

YES → S23 — FACT THAT MEASURED VALUE IS ACCURATE IS NOTIFIED

MONITORING SYSTEM AND MONITORING METHOD

RELATED APPLICATIONS

The present application is a National Phase of International Application Number PCT/JP2020/029813 filed Aug. 4, 2020 and claims priority from Japanese Application Number 2019-183795 filed Oct. 4, 2019.

TECHNICAL FIELD

The present disclosure relates to a monitoring system and a monitoring method of an alkaline degree.

The present application claims priority based on Japanese Patent Application No. 2019-183795 filed in Japan on Oct. 4, 2019, the contents of which are incorporated herein by reference.

BACKGROUND ART

In a line for performing a surface treatment of aircraft members such as aluminum or titanium, there are treatment steps such as degreasing, washing, etching, and coating. In each treatment step, it is necessary to manage concentration of a chemical in treatment liquid. For example, in an alkaline degreasing treatment step, an alkaline degree in the treatment liquid is measured by using a manual neutralization titration method, and a concentration management of the treatment liquid is performed.

PTL 1 discloses a method for measuring the alkalinity of each substance in treatment liquid in a surface washing step of a semiconductor substrate. In the measuring method of PTL 1, a light emitting substance that chemically emits light in response to a specific substance in the treatment liquid is added to the treatment liquid to emit light, and the alkalinity of the specific substance is measured based on the light emitting lightness.

CITATION LIST

Patent Literature
[PTL 1] Japanese Unexamined Patent Application Publication No. 7-306146

SUMMARY OF INVENTION

Technical Problem

As described above, the alkaline degree is often measured by using a manual analysis. In order to maintain the alkaline degree in the treatment liquid within a predetermined range, continuous and consecutive alkaline degree monitoring is required. However, manual alkaline degree measurement takes time, and even when the alkaline degree measurement is performed regularly, continuous monitoring is difficult. The alkaline degree in a degreasing treatment tank is affected by the number of treatments of a target product, treatment time, and other treatment steps on an upstream side. For example, when the number of treatments of the product increases rapidly, the alkaline degree of the treatment liquid also changes rapidly. However, the manual alkaline degree measurement may not be able to cope with such changes.

The present disclosure provides a monitoring system and a monitoring method that can solve the above problems.

Solution to Problem

According to the present disclosure, there is provided a monitoring system including: a reaction tank to which a solution is supplied; an indicator burette that drops an indicator into the reaction tank; a reagent burette that drops an acidic reagent into the reaction tank; an absorptiometry detector that is immersed in the solution; a measurement device that controls the indicator burette, the reagent burette, and the absorptiometry detector, and analyzes transmittance of the solution detected by the absorptiometry detector to measure an alkaline degree of the solution; a first system that collects a sample of alkaline treatment liquid from a treatment tank storing the treatment liquid and supplies the sample to the reaction tank as the solution; a discharge system that discharges the solution from the reaction tank; and a control device, in which the control device controls an operation of the first system and outputs a completion signal to the measurement device when supply of the solution to the reaction tank is completed, and controls the discharge system to discharge the solution from the reaction tank when measurement of the alkaline degree by the measurement device is completed.

According to the present disclosure, there is provided a monitoring method of a monitoring system including a reaction tank, an indicator burette, a reagent burette, a probe-type absorptiometry detector, a first system that collects alkaline treatment liquid from a treatment tank storing the treatment liquid and supplies the treatment liquid to the reaction tank, and a discharge system that discharges the treatment liquid from the reaction tank, the monitoring method including: causing the monitoring system to operate the first system to supply the treatment liquid to the reaction tank, operate the indicator burette to drop an indicator into the reaction tank, operate the reagent burette to repeatedly drop an acidic reagent into the reaction tank, detect transmittance of the treatment liquid each time the reagent is dropped by the absorptiometry detector, measure an alkaline degree of the treatment liquid based on the transmittance, and control the discharge system to discharge the treatment liquid in the reaction tank when measurement of the alkaline degree is completed.

Advantageous Effects of Invention

According to the above-mentioned monitoring system and the monitoring method, it is possible to consecutively and continuously monitor the alkaline degree in the treatment liquid.

BRIEF DESCRIPTION OF DRAWINGS

FIG. 1 is a schematic diagram of a surface treatment line including a monitoring system according to an embodiment.

FIG. 5 is a flowchart showing an example of control of the monitoring system according to the embodiment.

DESCRIPTION OF EMBODIMENTS

Embodiment

Figure 2:
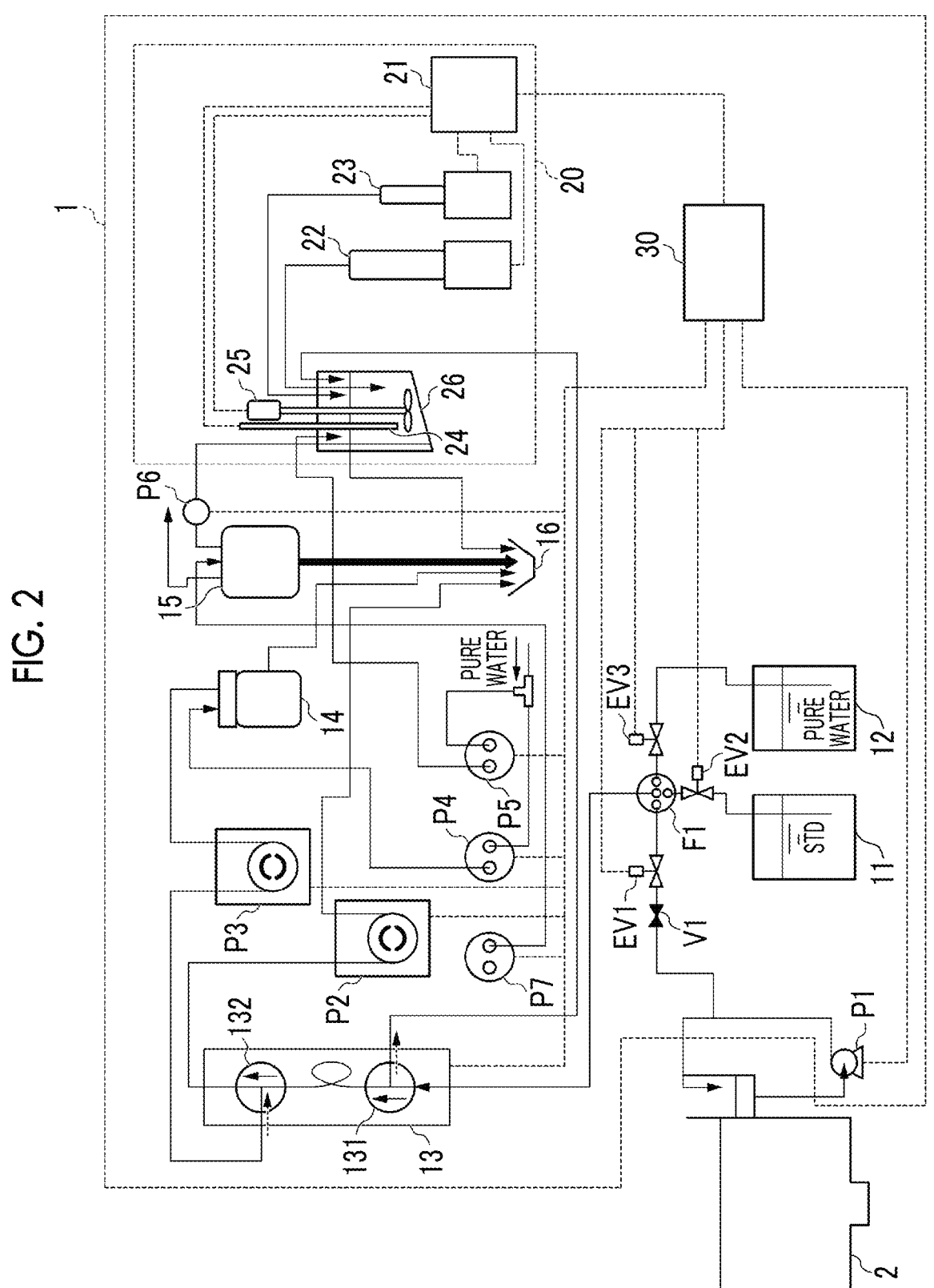
FIG. 2 is a configuration diagram showing an example of the monitoring system according to the embodiment.

Hereinafter, a monitoring system of an alkaline degree according to an embodiment will be described with reference to FIGS. 1 to 6.

(System Configuration)

Figure 1:
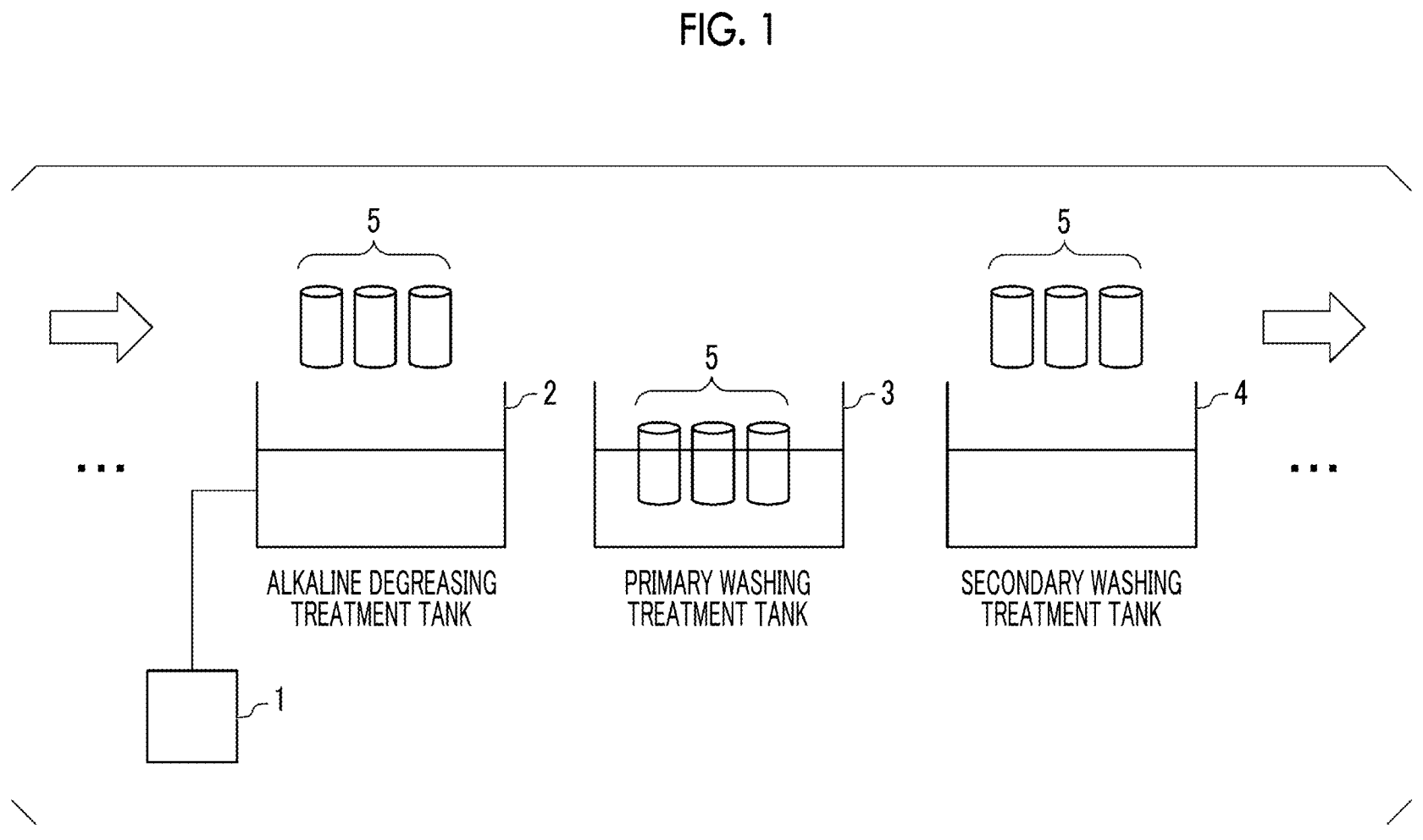

FIG. 1 is a schematic diagram of a surface treatment line including the monitoring system according to the embodiment.

The surface treatment line illustrated in FIG. 1 (for example, a surface treatment line of an aircraft member) is an excerpt of a step of performing an alkaline degreasing treatment among all steps. A plurality of treatment tanks such as an alkaline degreasing treatment tank 2, a primary washing treatment tank 3, and a secondary washing treatment tank 4 are installed in a degreasing treatment line. A crane (not shown) holds a product 5 whose material is made of aluminum or the like, conveys the product 5 to the alkaline degreasing treatment tank 2, the primary washing treatment tank 3, and the secondary washing treatment tank 4 in this order, and makes the product 5 to be immersed in treatment liquid of each treatment tank. For example, the alkaline degreasing treatment tank 2 stores alkaline treatment liquid having a predetermined alkaline degree, and the product 5 is immersed in the alkaline degreasing treatment tank 2 to perform a degreasing treatment for removing oil from a surface of the product 5. Thereafter, the product 5 is washed in the primary washing treatment tank 3 and the secondary washing treatment tank 4 in which pure water is stored. By moving the product 5 while being immersed in the treatment liquid of each treatment tank, the degreasing treatment for the product 5 is performed. The monitoring system 1 is connected to the alkaline degreasing treatment tank 2. The monitoring system 1 collects the treatment liquid in the alkaline degreasing treatment tank 2 to monitor the alkaline degree of the treatment liquid in the alkaline degreasing treatment tank 2.

FIG. 2 is a configuration diagram showing an example of the monitoring system of the alkaline degree according to the embodiment.

The monitoring system 1 includes a first system that supplies the alkaline degree of the treatment liquid to the reaction tank 26 of a measurement system 20, the measurement system 20 that measures an alkaline degree of a solution supplied to the reaction tank 26, a discharge system that discharges the solution supplied to the reaction tank 26 after the alkaline degree is measured, a second system that supplies a standard alkaline solution having a known alkaline degree to the reaction tank 26, a third system that supplies pure water to the reaction tank 26, and a control device 30 that controls each system. In the present embodiment, as a titrator to be supplied to the reaction tank 26, three types of the treatment liquid in the alkaline degreasing treatment tank 2, the standard alkaline liquid having the known alkaline degree, and the pure water are used, and the above-mentioned three types of liquid and liquid, which is obtained by dropping an indicator or a reagent thereon, are referred to as a solution.

The first system is configured to include pumps P1 to P5, a manual valve V1, an electromagnetic valve EV1, a fitting F1, a measuring pipe 13, a diluted solution container 14, a pipe connecting therebetween, and a pipe supplying the solution from the measuring pipe 13 to the measurement system 20.

The discharge system is configured to include pumps P6 to P7, a waste liquid trap 15, a waste liquid container 16, and a pipe connecting therebetween.

The second system does not include the pump P1, the manual valve V1, the electromagnetic valve EV1, and the pipe connecting thereof to the fitting F1 in the first system, but instead includes a standard alkaline solution tank 11, an electromagnetic valve EV2, and a pipe connecting thereof to the fitting F1. Other configurations are the same as those in the first system.

The third system does not include the pump P1, the manual valve V1, the electromagnetic valve EV1, and the pipe connecting thereof to the fitting F1 in the first system, but instead includes a pure water tank 12, an electromagnetic valve EV3, and a pipe connecting thereof to the fitting F1. Other configurations are the same as those in the first system.

The measurement system 20 includes a measurement device 21, a reagent burette 22 that drops an acidic reagent such as HCL into the reaction tank 26, an indicator burette 23 that drops an indicator such as methyl orange or methyl red into the reaction tank 26, a probe-type absorptiometry detector 24 to be inserted into the solution of the reaction tank 26, and a stirring device 25 to be inserted into the solution of the reaction tank 26. The measurement device 21 is connected to the reagent burette 22, the indicator burette 23, the absorptiometry detector 24, and the stirring device 25. The measurement device 21 controls operations of the reagent burette 22, the indicator burette 23, the absorptiometry detector 24, and the stirring device 25. The measurement device 21 acquires the absorbance that is detected by the absorptiometry detector 24, analyzes the titration result based on the acquired absorbance, and calculates the alkaline degree of the solution. The measurement system 20 is connected to the control device 30 and transmits and receives a control signal to and from the control device 30.

In general, a potentiometric titration device is often used for neutralization titration of alkali. The potentiometric titration device detects PH by immersing a glass electrode in a solution. The glass electrode may be damaged and there is a need for calibration work on the glass electrode. In the present embodiment, the absorptiometry detector 24 is immersed in the solution instead of the glass electrode, and the alkaline degree of the solution is measured by using a photometric titration method. The measurement system 20 automates processes of adding an indicator, titrating a reagent, and measuring an alkaline degree.

The control device 30 is connected to the pumps P1 to P7 and controls the operation of the pumps P1 to P7. The control device 30 is connected to the electromagnetic valves EV1 to EV3 and controls the opening degree of the electromagnetic valves EV1 to EV3. The control device 30 is connected to the measuring pipe 13 and switches three-way valves 131 and 132 inside the measuring pipe 13. The control device 30 is connected to the measurement device 21 and performs control of supplying the solution to the reaction tank 26 and discharging the solution from the reaction tank 26 in cooperation with the measurement device 21. The control device 30 is connected to notification means such as a monitor, a lamp, and a buzzer and notifies a monitoring person of the occurrence of an abnormality through the notification means when there is the abnormality in the alkaline degree of the treatment liquid in the alkaline degreasing treatment tank 2.

(Operation of First System)

The pump P1 draws the sample of the treatment liquid from the alkaline degreasing treatment tank 2 to the first system through the pipe connected to the alkaline degreasing treatment tank 2. The sample of the treatment liquid sucked by the pump P1 is sent to the pipe that connects the pump P1 and the fitting F1 to each other. The manual valve V1 and the electromagnetic valve EV1 are provided on this pipe. The manual valve V1 is normally in an open state, and the sample of the treatment liquid sucked by the pump P1 is sent to the measuring pipe 13 connected to the fitting F1 after the flow rate is adjusted at the electromagnetic valve EV1. The control device 30 controls the electromagnetic valve EV1 to a predetermined opening degree. The measuring pipe 13 has the three-way valves 131 and 132. The control device 30 controls the three-way valves 131 and 132 such that the flow of the sample of the treatment liquid is in a direction of the solid arrow, and for example, drives the pump P2 for a predetermined time (time during which the amount of the treatment liquid required for the measurement can be sucked). Thereafter, a predetermined amount (for example, 1 ml) of the sample of the treatment liquid is sucked by the pump P2 and flows into the measuring pipe 13. Next, the control device 30 controls the three-way valves 131 and 132 such that the flow of the sample of the treatment liquid flowing into the measuring pipe 13 is in a direction of the dashed arrow, and drives the pump P3. Thereafter, the diluted solution stored in the diluted solution container 14 is sent to the measuring pipe 13 by the pump P3. The diluted solution pushes out the sample of the treatment liquid flowing into the measuring pipe 13, and then the sample of the treatment liquid and the diluted solution are supplied to the reaction tank 26. The control device 30 operates the pump P3 for a predetermined time to supply the sample of the treatment liquid to the reaction tank 26 together with the diluted solution. The reaction tank 26 is connected to a pure water tank (not shown) via a pump P5, and the control device 30 operates the pump P5 to supply pure water in the pure water tank to the reaction tank 26. When the amount of the solution in the reaction tank 26 reaches a predetermined amount (for example, an amount sufficient to immerse the absorptiometry detector 24), the control device 30 stops the pump P5. As a result, the solution to be titrated is supplied to the reaction tank 26. When the supply of the solution containing the sample of the treatment liquid is completed, the control device 30 outputs a completion signal for notifying of the completion of the solution supply to the measurement device 21.

The diluted solution container 14 is connected to the pure water tank (not shown) via a pump P4. When the amount of the diluted solution (pure water) in the diluted solution container 14 is lowered than a predetermined amount, the control device 30 drives the pump P4 to fill the diluted solution container 14 with the diluted solution.

When the first system is operated, the control device 30 controls the electromagnetic valves EV2 and EV3 in a closed state.

(Operation of Measurement System)

Figure 3:
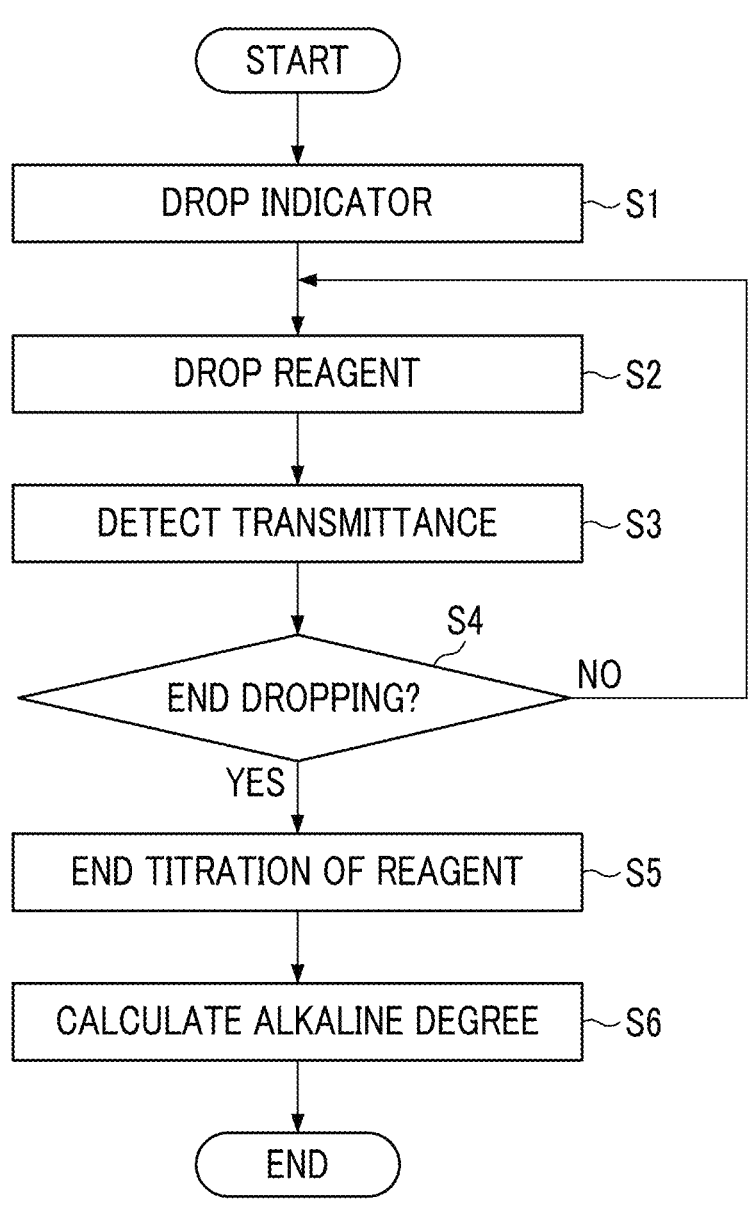
FIG. 3 is a flowchart showing an example of a measurement process of an alkaline degree according to the embodiment.

When the completion signal of the solution supply is acquired, the measurement device 21 starts the measurement of the alkaline degree. The flow of the measurement process of the alkaline degree of the solution by the measurement system 20 will be described with reference to FIG. 3. FIG. 3 is a flowchart showing an example of the measurement process of the alkaline degree according to the embodiment.

First, the measurement device 21 operates the indicator burette 23 to drop a predetermined amount of the indicator into the reaction tank 26 (step S1). For example, when methyl orange is dropped, the solution having alkalinity is colored yellow. Next, the measurement device 21 operates the reagent burette 22 to drop a predetermined amount (for example, 0.1 M) of the reagent into the reaction tank 26 (step S2). When the reagent is dropped, the measurement device 21 instructs the absorptiometry detector 24 to detect the transmittance. The absorptiometry detector 24 detects the transmittance of the solution in the reaction tank 26 (step S3) and outputs the detection result to the measurement device 21. The measurement device 21 stores the transmittance. After that, the measurement device 21 repeats the processes of steps S2 and S3. That is, the measurement device 21 operates the reagent burette 22 at predetermined time intervals and repeatedly drops the reagent in predetermined amounts at a time. Each time the reagent is dropped, the absorptiometry detector 24 detects the transmittance and outputs the detection result to the measurement device 21. The measurement device 21 stores the transmittance detected by the absorptiometry detector 24 together with the number of titrations of the reagent or the total amount of dropping. While dropping the reagent, the measurement device 21 determines whether or not to end the dropping (step S4). When it is determined not to end the dropping (step S4: No), the measurement device 21 repeats the processes of steps S2 and S3.

Figure 4:
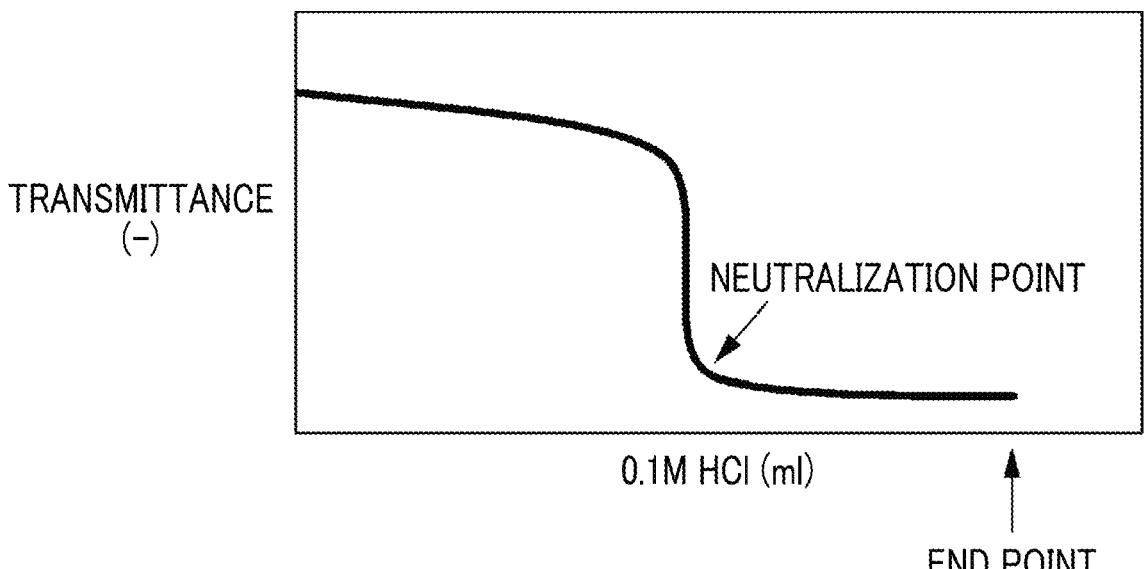
FIG. 4 is a diagram showing an example of a measurement result according to the embodiment.

Here, a description will be made with reference to FIG. 4. FIG. 4 is a diagram showing an example of the measurement result according to the embodiment. The vertical axis in FIG. 4 indicates the transmittance measured by the absorptiometry detector 24, and the horizontal axis indicates the total amount of reagents (HCL) dropped into the reaction tank 26. The measurement device 21 is configured to drop the HCL in a predetermined amount at a time and end the dropping of the reagent when the HCL is further dropped a predetermined number of times after the transmittance is lowered to a predetermined value or less. When the methyl orange is used as the indicator, the color of the solution changes to yellow, orange, and red. The measurement device 21 detects that the color of the solution is turned red based on the transmittance detected by the absorptiometry detector 24, thereafter, for example, stops the dropping of the HCL when the HCL is dropped a few times (the end point shown in the figure). When the total amount of the dropped reagents reaches the end point illustrated in the figure, the measurement device 21 determines to end the dropping (step S4: Yes) and ends the dropping operation of the reagent burette 22 (step S5).

When the dropping of the reagent is ended, the measurement device 21 calculates a neutralization point from the change in the transmittance illustrated in FIG. 4 and calculates the alkaline degree of the sample of the treatment liquid from the total amount of the HCL at the neutralization point (step S6). Since the amount of the sample of the treatment liquid supplied to the reaction tank 26 is controlled to be constant by the control of the measuring pipe 13, the alkaline degree of the sample of the treatment liquid can be calculated from the titration amount of HCL. The measurement device 21 outputs the alkaline degree of the sample of the treatment liquid to the control device 30.

(Operation of Discharge System)

When the notification of the alkaline degree of the treatment liquid is acquired, the control device 30 determines whether or not the measured alkaline degree is appropriate and notifies a monitoring person of the suitability of the measurement result by using the notification means. Based on the notification of the alkaline degree, it is determined that the current measurement is completed, and the solution in the reaction tank 26 is controlled to be discharged in preparation for the next measurement. For example, the control device 30 operates the pump P6 to discharge the solution in the reaction tank 26 to the waste liquid container 16 via the waste liquid trap 15. The waste liquid trap 15 is connected to the pump P7 that sends out air, and by operating the pump P7, the control device 30 can take in the air into the waste liquid trap 15 and discharge the gas in the waste liquid trap 15 to the outside of the waste liquid trap 15.

By repeatedly controlling the first system, the measurement system 20, and the discharge system, it is possible to automatically monitor the alkaline degree in the alkaline degreasing treatment tank 2. Any cycle can be used for performing a control to take in the solution containing the sample of the treatment liquid by the first system, to measure the alkaline degree by the measurement system 20, and to discharge the solution containing the sample of the treatment liquid by the discharge system. For example, the alkaline degree of the sample of the treatment liquid may be measured in a short cycle when the number of treatments of the product 5 is large, and the cycle for measuring the alkaline degree of the sample of the treatment liquid may be lengthened when the number of treatments of the product 5 is small.

The monitoring system 1 has a system for inspecting the measurement accuracy by the measurement system 20 in addition to the system for measuring the alkaline degree of the treatment liquid in the alkaline degreasing treatment tank 2. For example, the monitoring system 1 supplies the standard alkaline solution or the pure water having a known alkaline degree to the reaction tank 26 and inspects the measurement accuracy of the measurement system 20 based on a measured value of the measurement system 20 when those liquids are supplied. Next, these mechanisms will be described.

(Operation of Second System)

The standard alkaline solution having a known alkaline degree is stored in the standard alkaline solution tank 11. A pipe connected to the fitting F1 is connected to the standard alkaline solution tank 11. The electromagnetic valve EV2 is provided on this pipe. When the second system is operated, the control device 30 controls the electromagnetic valve EV2 to a predetermined opening degree and controls the electromagnetic valves EV1 and EV3 to be in a closed state. When the control device 30 operates the pump P2, the standard alkaline solution is sent to the measuring pipe 13 connected to the fitting F1 after adjusting the flow rate by the electromagnetic valve EV2. The remaining control when the standard alkaline solution is supplied to the reaction tank 26 is the same as in the first system. That is, the control device 30 controls the three-way valves 131 and 132 and the pumps P2 and P3 to send a predetermined amount (1 ml) of the standard alkaline solution to the reaction tank 26. The control device 30 operates the pump P5 such that the amount of solution in the reaction tank 26 becomes the predetermined amount and sends the pure water to the reaction tank 26. When the supply of the solution containing the standard alkaline solution to the reaction tank 26 is completed, the control device 30 outputs the completion signal for notifying of the completion of the supply of the standard alkaline solution to the measurement device 21.

When the completion signal of the supply of the standard alkaline solution is acquired, the measurement device 21 measures the alkaline degree of the standard alkaline solution in the same procedure as described above and outputs the result to the control device 30. The control device 30 compares the alkaline degree measured by the measurement device 21 with the known alkaline degree of the standard alkaline solution and determines whether or not a difference therebetween is within a predetermined allowable range. The determination result is notified by the control device 30 by using the notification means. The control device 30 controls the discharge system as described above to discharge the solution in the reaction tank 26. For example, by subsequently operating the first system, it is possible to monitor the alkaline degree of the alkaline degreasing treatment tank 2.

(Operation of Third System)

The pure water is stored in the pure water tank 12. A pipe connected to the fitting F1 is connected to the pure water tank 12. The electromagnetic valve EV3 is provided on this pipe. When the third system is operated, the control device 30 controls the electromagnetic valve EV3 to a predetermined opening degree and controls the electromagnetic valves EV1 and EV2 to be in a closed state. When the control device 30 operates the pump P2, the pure water is sent to the measuring pipe 13 connected to the fitting F1 after adjusting the flow rate by the electromagnetic valve EV3. The remaining control when the pure water is supplied to the reaction tank 26 is the same as in the first and second systems. The control device 30 controls the three-way valves 131 and 132 and the pumps P2 and P3 to send a predetermined amount (1 ml) of the pure water to the reaction tank 26. The control device 30 operates the pump P5 to send the pure water from the pure water tank (not shown) to the reaction tank 26. When the supply of the solution of the pure water to the reaction tank 26 is completed, the control device 30 outputs the completion signal of the supply of the pure water to the measurement device 21.

When the completion signal of the supply of the pure water is acquired, the measurement device 21 measures the alkaline degree of the pure water in the same procedure as described above and outputs the result to the control device 30. The control device 30 compares the alkaline degree measured by the measurement device 21 with the known alkaline degree of the pure water and determines whether or not a difference therebetween is within a predetermined allowable range. The determination result is notified by the control device 30 by using the notification means. The control device 30 controls the discharge system as described above to discharge the solution in the reaction tank 26.

In the monitoring system 1, the first system is operated to consecutively and continuously perform the alkaline degree monitoring of the alkaline degreasing treatment tank 2 at predetermined time intervals (for example, every 30 minutes to 1 hour), and the measurement accuracy inspection of the measurement system 20 by the second system or the third system is intermittently performed (for example, every day). By the control of the control device 30 as described above, the alkaline degree monitoring of the alkaline degreasing treatment tank 2 and the measurement accuracy inspection of the measurement system 20 can be smoothly switched. Therefore, the measurement accuracy inspection of the measurement system 20 can be performed and the accuracy of the alkaline degree monitoring can be maintained without hindering the alkaline degree monitoring of the alkaline degreasing treatment tank 2. When the measurement accuracy of the measurement system is lowered, it is possible to resume the accurate alkaline degree monitoring by promptly performing the maintenance of the measurement system 20.

(Control of Monitoring System 1)

Next, an example of control of the monitoring system 1 will be described with reference to FIG. 5.

FIG. 5 is a flowchart showing an example of the control of the monitoring system of the alkaline degree according to the embodiment. As a premise, it is assumed that the control device 30 stores in advance each information such as time to perform the accuracy inspection of the measurement system 20 (for example, once a day), a time zone for performing the alkaline degree monitoring of the alkaline degreasing treatment tank 2 (for example, time zone excluding the time for performing the accuracy inspection), the allowable range of the alkaline degree of the treatment liquid in the alkaline degreasing treatment tank 2, and the alkaline degree of the standard alkaline solution. When the pump P1 is constantly operated and the electromagnetic valve EV1 is opened, the control device 30 can allow the sample of the treatment liquid in the alkaline degreasing treatment tank 2 to flow into the monitoring system 1. The control device 30 performs the following processes in a predetermined control cycle while the monitoring system 1 is in operation.

First, the control device 30 determines whether or not it is the time to perform the accuracy inspection of the measurement system 20 (step S11). For example, when the current time is included in the time for performing the accuracy inspection of the measurement system 20, the control device 30 determines to perform the accuracy inspection.

When it is determined that the accuracy inspection is to be performed (step S11: Yes), the control device 30 controls the electromagnetic valve EV2 and the like for the accuracy inspection of the measurement system 20 by using the standard alkaline solution (step S17). Specifically, the control device 30 opens the electromagnetic valve EV2 to an appropriate opening degree and closes the other electromagnetic valves EV1 and EV3. The control device 30 operates the pumps P2 and P3 to supply a predetermined amount of the standard alkaline solution to the reaction tank 26 and operates the pump P5 to supply a predetermined amount of the pure water to the reaction tank 26. The control device 30 outputs the completion signal of the supply of the solution to the measurement system 20 (measurement device 21). Next, the measurement system 20 measures the alkaline degree of the standard alkaline solution (step S18). The measurement system 20 measures the alkaline degree by the processes described with reference to FIGS. 3 and 4. The measurement system 20 outputs the measured alkaline degree value to the control device 30. The control device 30 acquires the measured value of the alkaline degree and temporarily stores the measured value.

Next, the control device 30 controls the electromagnetic valve EV3 and the like for the accuracy inspection of the measurement system 20 by using the pure water (step S19). Specifically, the control device 30 opens the electromagnetic valve EV3 to an appropriate opening degree and closes the other electromagnetic valves EV1 and EV2. The control device 30 operates the pumps P2 and P3 to supply a predetermined amount of the pure water to the reaction tank 26 and operates the pump P5 to supply a predetermined amount of the pure water to the reaction tank 26. The control device 30 outputs the completion signal of the supply of the solution to the measurement system 20. Next, the measurement system 20 measures the alkaline degree of the pure water (step S20). The measurement system 20 measures the alkaline degree of the pure water by the processes described with reference to FIGS. 3 and 4. The measurement system 20 outputs the measured alkaline degree value to the control device 30. The control device 30 acquires the measured value of the alkaline degree and temporarily stores the measured value.

Next, the control device 30 determines whether or not the measured values of the alkaline degree measured in steps S18 and S20 are accurate (step S21). Specifically, the control device 30 determines that the measured value obtained by the measurement system 20 (measurement device 21) is accurate when a difference between the alkaline degree measured in step S18 and the alkaline degree of the standard alkaline solution is within the predetermined allowable range, and determines that the measured value of the measurement system 20 is not accurate when the difference is out of the allowable range. The control device 30 determines that the measured value of the measurement system 20 is accurate when a difference between the alkaline degree measured in step S20 and the alkaline degree of the pure water is within the predetermined allowable range, and determines that the measured value of the measurement system 20 is not accurate when the difference is out of the allowable range. The control device 30 may determine that the measured value of the measurement system 20 is not accurate when any of the difference between the alkaline degree measured in steps S18 and S20 and the each of the set values is out of the predetermined allowable range. Alternatively, the control device 30 may determine that the measured value of the measurement system 20 is not accurate when both the differences between the alkaline degrees measured in steps S18 and S20 and the each of the set values is out of the predetermined allowable range. When it is determined that the measured value of the measurement system 20 is not accurate (step S21: No), an alarm indicating that there is a possibility that the measurement system 20 has a failure is notified by the control device 30 (step S22). For example, the control device 30 may display the alarm on a monitor together with the measured value of the alkaline degree. When it is determined that the measured value of the alkaline degree is accurate (step S21: Yes), the fact that the measured value of the measurement system 20 is accurate is notified by the control device 30 (step S23).

Regardless of the determination result in step S20, the control device 30 repeats the processes from step S11.

When the accuracy inspection of the measurement system 20 is performed, it is assumed that the accuracy inspection by using the standard alkaline solution and the accuracy inspection by using the pure water are continuously performed, but the time for performing the accuracy inspection by using the standard alkaline solution and the time for performing the accuracy inspection by using the pure water may be staggered and performed independently.

On the other hand, when it is determined that the accuracy inspection is not performed in step S11 (step S11: No), the control device 30 controls the electromagnetic valve EV1 and the like for monitoring the alkaline degree in the alkaline degreasing treatment tank 2 (step S12). Specifically, the control device 30 opens the electromagnetic valve EV1 to a predetermined opening degree and closes the other electromagnetic valves EV2 and EV3. The control device 30 operates the pumps P2 and P3 to supply a predetermined amount of the sample of the treatment liquid to the reaction tank 26 from the alkaline degreasing treatment tank 2 and operates the pump P5 to supply a predetermined amount of the pure water to the reaction tank 26. The control device 30 outputs the completion signal of the supply of the solution to the measurement system 20. The measurement system 20 measures the alkaline degree of the sample of the treatment liquid (step S13). The measurement system 20 outputs the measured alkaline degree value to the control device 30. The control device 30 acquires the measured value of the alkaline degree and temporarily stores the measured value.

Next, the control device 30 determines whether or not the measured value of the alkaline degree measured in step S13 is appropriate (step S14). Specifically, the control device 30 determines that the alkaline degree of the treatment liquid in the alkaline degreasing treatment tank is appropriate when a difference between the alkaline degree measured in step S13 and the set value of the alkaline degree in the alkaline degreasing treatment tank 2 is within the predetermined allowable range. When it is determined that the alkaline degree is appropriate (step S14: Yes), the fact that the alkaline degree of the treatment liquid in the alkaline degreasing treatment tank 2 is appropriate is notified by the control device 30 (step S16). When it is determined that the alkaline degree is not appropriate (step S14: No), the fact that the alkaline degree of the treatment liquid in the alkaline degreasing treatment tank 2 is abnormal is notified by the control device 30 (step S15). For example, the control device 30 may display an instruction to add an alkaline degreasing solution or a diluted solution on the monitor together with the alkaline degree.

Regardless of the determination result in step S14, the control device 30 repeats the processes from step S11.

The monitoring system 1 of the present embodiment includes the first system that supplies the sample of the treatment liquid in the alkaline degreasing treatment tank 2 to the reaction tank 26, the second system that supplies the standard alkaline solution (liquid having a known alkaline degree) to the reaction tank 26, the third system that supplies the pure water to the reaction tank 26, and the discharge system that discharges the solution from the reaction tank 26. Thereafter, normally, the first system is operated to consecutively perform the alkaline degree monitoring in the alkaline degreasing treatment tank 2. The second system and the third system are intermittently operated to inspect the measurement accuracy of the alkaline degree by the measurement system 20. Even in a case where any of the first system to the third system is operated, when the measurement of the alkaline degree by the measurement system 20 is ended, the control device 30 operates the discharge system to discharge the solution in the reaction tank 26. Therefore, according to the present embodiment, it is possible to continuously perform the alkaline degree monitoring in which the measurement accuracy of the alkaline degree is guaranteed. As a result, even when the change is occurred in the alkaline degree in the alkaline degreasing treatment tank 2 due to a variation in the number of productions of the product 5, the change can be quickly detected and handled. Therefore, the quality of the product 5 in the surface treatment line can be ensured, and the occurrence of yield can be reduced.

The monitoring system 1 of the present embodiment is provided with an automatic photometric titration device (measurement system 20) including the probe-type absorptiometry detector 24 (for example, a UV absorption detector) instead of the glass electrode used for PH measurement in a general neutralization titration device. With the measurement system 20 of the present embodiment, the glass electrode is not damaged and there is no need for calibration work on the glass electrode.

Although FIG. 2 shows a configuration example of the monitoring system 1 in which both the second system and the third system mechanisms are provided, a configuration in which only one is provided may be used.

Figure 6:
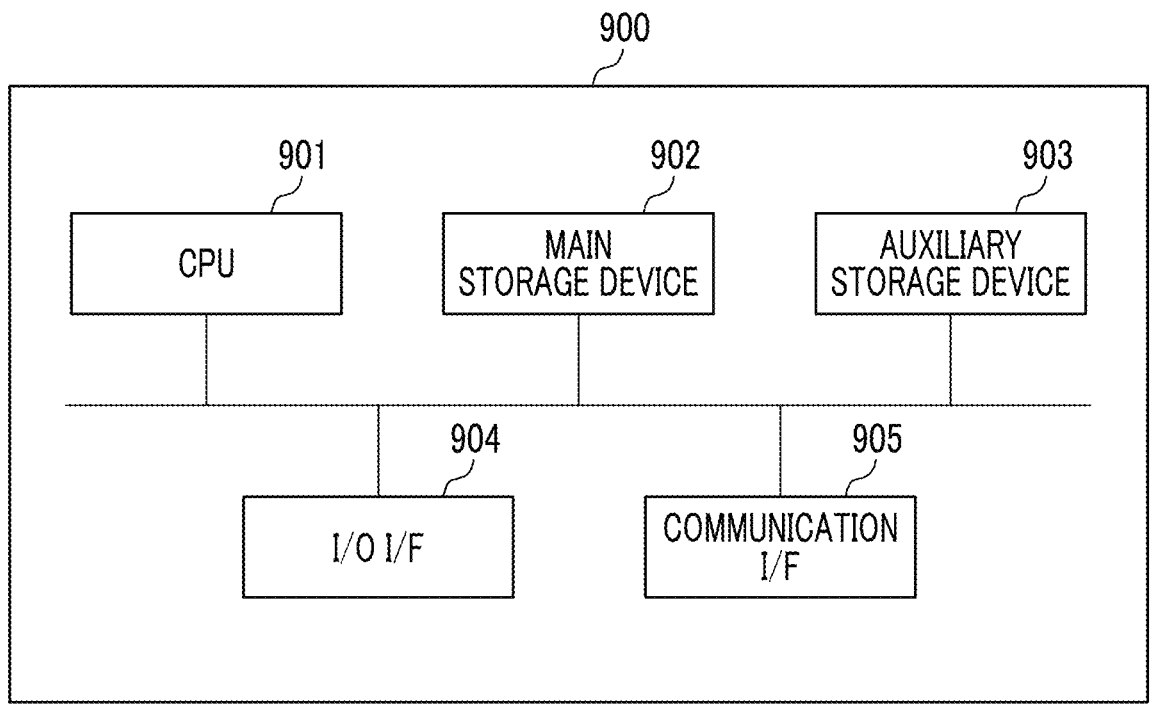
FIG. 6 is a diagram showing an example of a hardware configuration of a measurement device and a control device according to the embodiment.

FIG. 6 is a diagram showing an example of a hardware configuration of the measurement device and the control device according to the embodiment.

A computer 900 includes a CPU 901, a main storage device 902, an auxiliary storage device 903, an I/O interface 904, and a communication interface 905.

The measurement device 21 and the control device 30 described above are mounted on the computer 900. Further, the above-mentioned each function is stored in the auxiliary storage device 903 in the form of a program. The CPU 901 reads the program from the auxiliary storage device 903, loads the program into the main storage device 902, and executes the above treatments according to the program. The CPU 901 ensures a storage area in the main storage device 902 according to the program. The CPU 901 ensures a storage area for storing the data being processed in the auxiliary storage device 903 according to the program.

A program for implementing all or a part of the functions of the measurement device 21 and the control device 30 may be recorded on a computer-readable recording medium, and the program recorded on the recording medium may be read by a computer system and executed to perform processes by each functional unit. The term "computer system" as used herein includes hardware such as an OS or peripheral devices. The "computer system" is also assumed to include a homepage providing environment (or display environment) when a WWW system is used. The "computer-readable recording medium" refers to a portable medium such as a CD, DVD, or USB, or a storage device such as a hard disk built in the computer system. When this program is distributed to the computer 900 by using a communication line, the computer 900, which is received the distribution of the program, may load the program into the main storage device 902 and execute the above processes. The above-mentioned program may be a program for implementing a part of the above-mentioned functions and further implementing the above-mentioned functions in combination with a program already recorded in the computer system.

As described above, some embodiments according to the present disclosure have been described, but all of these embodiments are presented as examples and are not intended to limit the scope of the invention. These embodiments can be implemented in various other forms, and various omissions, replacements, and changes can be made without departing from the gist of the invention. These embodiments and variations thereof are included in the scope of the invention described in the claims and the equivalent scope thereof, as are included in the scope and gist of the invention.

<Additional Notes>

The monitoring system 1 and the monitoring method described in each embodiment are ascertained as follows, for example.

(1) According to a first aspect, there is provided a monitoring system 1 including: a reaction tank 26 to which a solution is supplied; an indicator burette 23 that drops an indicator into the reaction tank 26; a reagent burette 22 that drops an acidic reagent (HCL) into the reaction tank 26; an absorptiometry detector 24 that is immersed in the solution; a measurement device 21 that controls the indicator burette 23, the reagent burette 22, and the absorptiometry detector 24, and analyzes transmittance of the solution detected by the absorptiometry detector 24 to measure an alkaline degree of the solution; a first system that collects a sample of alkaline treatment liquid from a treatment tank (alkaline degreasing treatment tank 2) storing the treatment liquid and supplies the sample to the reaction tank 26 as the solution; a discharge system that discharges the solution from the reaction tank 26; and a control device 30, in which the control device 30 controls an operation of the first system and outputs a completion signal to the measurement device 21 when supply of the solution to the reaction tank 26 is completed, and controls the discharge system to discharge the solution from the reaction tank 26 when measurement of the alkaline degree by the measurement device 21 is completed.

According to the monitoring system 1, the sample of the treatment liquid is collected by the first system and supplied to the measurement system 20, and the alkaline degree that is measured by the measurement system 20 is determined, thereby it is possible to monitor whether the alkaline degree of the treatment liquid in the alkaline degreasing treatment tank 2 is appropriate. By controlling the first system, the measurement device 21, and the discharge system, it is possible to automate the supply of the sample from the alkaline degreasing treatment tank 2 to the reaction tank 26, the measurement of the alkaline degree, and the discharge of the sample, thereby the continuous and consecutive monitoring of the alkaline degree can be performed.

Further, in general, the alkaline degree is often measured by using a glass electrode, but according to the monitoring system 1, since the absorptiometry detector 24 is used, the glass electrode is not damaged and there is no need for calibration work on the glass electrode. Therefore, the measurement system 20 including the reaction tank 26, the indicator burette 23, the reagent burette 22, the absorptiometry detector 24, and the measurement device 21 is easy to handle and has excellent portability.

(2) The monitoring system 1 according to a second aspect is the monitoring system 1 of (1), in which a second system that supplies a standard alkaline solution having a known alkaline degree to the reaction tank is further included, the measurement device 21 measures an alkaline degree of the standard alkaline solution, and the control device 30 evaluates measurement accuracy by the measurement device 21 based on the alkaline degree of the standard alkaline solution measured by the measurement device 21.

According to the monitoring system 1 of (2), the solution having a known alkaline degree is supplied to the reaction tank 26 by the second system, and by comparing the alkaline degree measured by the measurement device 21 with the known alkaline degree, the measurement accuracy of the measurement device 21 can be inspected. By performing the accuracy inspection of the measurement device 21, the monitoring accuracy of the alkaline degree can be ensured.

(3) The monitoring system 1 according to a third aspect is the monitoring system 1 of (1) or (2), in which the control device 30 operates the first system and stops the second system to monitor the alkaline degree of the treatment tank (alkaline degreasing treatment tank 2), and intermittently stops the first system and operates the second system while the first system is intermittently stopped to evaluate the measurement accuracy by the measurement device.

As a result, the monitoring of the alkaline degree of the treatment liquid in the alkaline degreasing treatment tank 2 can be continuously performed, and the accuracy of the alkaline degree measurement by the measurement device 21 can be inspected in the intervals of the monitoring of the alkaline degree. Since the monitoring of the alkaline degree and the accuracy inspection can be switched smoothly, stable monitoring can be consecutively performed.

(4) The monitoring system 1 according to a fourth aspect is the monitoring system 1 of (1) to (3), in which a third system that supplies pure water to the reaction tank is further included, the control device 30 evaluates measurement accuracy by the measurement device 21 based on an alkaline degree of the pure water measured by the measurement device 21.

By evaluating the measurement accuracy of the alkaline degree by the measurement device 21 using the pure water, the monitoring accuracy of the alkaline degree can be ensured.

(5) According to a fifth aspect, there is provided a monitoring method of a monitoring system including a reaction tank, an indicator burette, a reagent burette, a probe-type absorptiometry detector, a first system that collects alkaline treatment liquid from a treatment tank storing the treatment liquid and supplies the treatment liquid to the reaction tank, and a discharge system that discharges the treatment liquid from the reaction tank, the monitoring method including: causing the monitoring system to operate the first system to supply the treatment liquid to the reaction tank, operate the indicator burette to drop an indicator into the reaction tank, operate the reagent burette to repeatedly drop an acidic reagent into the reaction tank, detect transmittance of the treatment liquid each time the reagent is dropped by the absorptiometry detector, calculate an alkaline degree of the treatment liquid based on the transmittance, and control the discharge system to discharge the treatment liquid in the reaction tank when calculation of the alkaline degree is completed.

REFERENCE SIGNS LIST

1 monitoring system
2 alkaline degreasing treatment tank
3 primary washing treatment tank
4 secondary washing treatment tank
P1 to P7 pump
V1 manual valve
EV1 to EV3 electromagnetic valve
Fl fitting
11 standard alkaline solution tank
12 pure water tank
13 measuring pipe
131, 132 three-way valve
14 diluted solution container
15 waste liquid trap
16 waste liquid container
20 measurement system
21 measurement device
22 reagent burette
23 indicator burette
24 absorptiometry detector
25 stirring device
26 reaction tank
30 control device
200 automatic addition system
900 computer
901 CPU
902 main storage device
903 auxiliary storage device
904 I/O interface
905 communication interface

The invention claimed is:

1. A monitoring system comprising:
a reaction tank to which a solution is supplied;
an indicator burette that drops an indicator into the reaction tank;
a reagent burette that drops an acidic reagent into the reaction tank;
an absorptiometry detector that is immersed in the solution;
a measurement device that controls the indicator burette, the reagent burette, and the absorptiometry detector, and analyzes transmittance of the solution detected by the absorptiometry detector to measure an alkaline degree of the solution;

a first system that collects a sample of alkaline treatment liquid from a treatment tank storing the treatment liquid and supplies the sample to the reaction tank as the solution;

a discharge system that discharges the solution from the reaction tank to a waste liquid container; and a control device, wherein the first system includes:

the treatment tank;

a measuring pipe;

a diluted solution container;

the reaction tank;

a first pipe connecting the treatment tank and the measuring pipe;

a second pipe connecting the measuring pipe and the reaction tank;

a third pipe connecting the measuring pipe and the waste liquid container;

a fourth pipe connecting the measuring pipe and the waste liquid container;

a first pump that is provided to the first pipe, and draws in the treatment liquid from the treatment tank and sends out the treatment liquid to the measuring pipe;

a second pump that is provided to the third pipe, and draws in the treatment liquid sent out from the first pump to the measuring pipe;

a third pump that is provided to the fourth pipe, and draws in a diluted solution stored in the diluted solution container and sent out the diluted solution to the measuring pipe;

the control device operates the first pump, and further operates the second pump for a predetermined time to draw in a predetermined amount of the treatment liquid required for measurement to the measuring pipe, and thereafter, by operating the third pump to send out the diluted solution to the measuring pipe, provides the treatment liquid drawn in to the measuring pipe and the diluted solution to the reaction tank as the solution through the second pipe, and outputs a completion signal to the measurement device when supply of the solution to the reaction tank is completed, and controls the discharge system to discharge the solution from the reaction tank when measurement of the alkaline degree by the measurement device is completed, wherein the solution is monitored based on the alkaline degree of the solution which is measured.

2. The monitoring system according to claim 1, further comprising:

a second system that supplies a standard alkaline solution having a known alkaline degree to the reaction tank, wherein the measurement device measures an alkaline degree of the standard alkaline solution, and the control device evaluates measurement accuracy by the measurement device based on the alkaline degree of the standard alkaline solution measured by the measurement device.

3. The monitoring system according to claim 2, wherein the control device operates the first system and stops the second system to monitor the alkaline degree of the treatment tank, and

intermittently stops the first system and operates the second system while the first system is intermittently stopped to evaluate the measurement accuracy by the measurement device.

4. The monitoring system according to claim 1, further comprising:

a third system that supplies pure water to the reaction tank, wherein the control device evaluates measurement accuracy by the measurement device based on an alkaline degree of the pure water measured by the measurement device.

5. The monitoring system according to claim 2, further comprising:

a third system that supplies pure water to the reaction tank, wherein the control device evaluates measurement accuracy by the measurement device based on an alkaline degree of the pure water measured by the measurement device.

6. The monitoring system according to claim 3, further comprising:

a third system that supplies pure water to the reaction tank, wherein the control device evaluates measurement accuracy by the measurement device based on an alkaline degree of the pure water measured by the measurement device.

7. A monitoring method of a monitoring system including a reaction tank, an indicator burette, a reagent burette, a probe-type absorptiometry detector, a first system that collects alkaline treatment liquid from a treatment tank storing the treatment liquid and supplies the treatment liquid to the reaction tank, and a discharge system that discharges the treatment liquid from the reaction tank to a waste liquid container, wherein the first system includes:

the treatment tank;

a measuring pipe;

a diluted solution container;

the reaction tank;

a first pipe connecting the treatment tank and the measuring pipe;

a second pipe connecting the measuring pipe and the reaction tank;

a third pipe connecting the measuring pipe and the waste liquid container;

a fourth pipe connecting the measuring pipe and the waste liquid container;

a first pump that is provided to the first pipe, and draws in the treatment liquid from the treatment tank and sends out the treatment liquid to the measuring pipe;

a second pump that is provided to the third pipe, and draws in the treatment liquid sent out from the first pump to the measuring pipe;

a third pump that is provided to the fourth pipe, and draws in a diluted solution stored in the diluted solution container and sent out the diluted solution to the measuring pipe, the monitoring method comprising:

causing the monitoring system to;

operate the first pump;

operate the second pump for a predetermined time to draw in a predetermined amount of the treatment liquid required for measurement to the measuring pipe, operate the third pump to send out the diluted solution to the measuring pipe, provide the treatment liquid drawn in to the measuring pipe and the diluted solution to the reaction tank as the solution through the second pipe, operate the first system to supply the treatment liquid to the reaction tank, operate the indicator burette to drop an indicator into the reaction tank, operate the reagent burette to repeatedly drop an acidic reagent into the reaction tank, detect transmittance of the treatment liquid each time the reagent is dropped by the absorptiometry detector, measure an alkaline degree of the treatment liquid based on the transmittance, and control the discharge system to discharge the treatment liquid in the reaction tank when measurement of the alkaline degree is completed.

\* \* \* \* \*